US011654805B2

(12) United States Patent
Yang et al.

(10) Patent No.: US 11,654,805 B2
(45) Date of Patent: May 23, 2023

(54) TRIM COVER ASSEMBLY WITH BEZEL SUPPORT

(71) Applicant: Lear Corporation, Southfield, MI (US)

(72) Inventors: Wenjuan Yang, Shanghai (CN); Yong Yang, Shanghai (CN); Qun Liu, Shanghai (CN); Shaoying Chen, Shanghai (CN)

(73) Assignee: LEAR CORPORATION, Southfield, MI (US)

( * ) Notice: Subject to any disclaimer, the term of this patent is extended or adjusted under 35 U.S.C. 154(b) by 0 days.

(21) Appl. No.: 17/689,244

(22) Filed: Mar. 8, 2022

(65) Prior Publication Data
US 2022/0402416 A1 Dec. 22, 2022

(30) Foreign Application Priority Data

Jun. 21, 2021 (CN) .......................... 2021106853296

(51) Int. Cl.
*B60R 21/16* (2006.01)
*B60R 21/215* (2011.01)
*B60N 2/58* (2006.01)

(52) U.S. Cl.
CPC ......... *B60N 2/5883* (2013.01); *B60N 2/5825* (2013.01)

(58) Field of Classification Search
CPC .... B60N 2/5883; B60N 2/5825; B60R 13/02; B60R 13/04
See application file for complete search history.

(56) References Cited

U.S. PATENT DOCUMENTS

| 7,879,425 B2* | 2/2011 | Schulte | B60R 13/0256 |
| | | | 296/146.7 |
| 8,733,834 B2* | 5/2014 | Palmer | B60N 2/585 |
| | | | 297/218.4 |

(Continued)

FOREIGN PATENT DOCUMENTS

| DE | 102005039256 B4 | 2/2007 |
| DE | 102010063426 A1 | 6/2012 |

(Continued)

*Primary Examiner* — Shin H Kim
(74) *Attorney, Agent, or Firm* — Brooks Kushman P.C.

(57) ABSTRACT

A seat assembly includes a seat cushion having an external surface and defining a recess therein, the recess being open to the external surface and being sized to receive one or more bezel components and a trim cover assembly disposed over the seat cushion. The trim cover assembly includes a trim cover having an A-side as an occupant surface and a B-side, opposite the A-side, facing the external surface of the seat cushion, with the trim cover defining a cover opening therethrough generally corresponding to the recess in the seat cushion. The trim cover also has a plurality of flaps spaced about the cover opening, with each flap having an inner portion towards the cover opening and an outer portion opposite the inner portion. The trim cover assembly also includes a bezel support member having an A-surface contacting the B-side of the trim cover, and a B-surface opposite the A-surface. The bezel support member has an inner periphery defining a support opening corresponding to the cover opening, and an outer periphery, where the flaps of the trim cover are folded through the support opening and secured to at least a portion of the bezel support member or to the trim cover to support the cover opening. The seat assembly also includes a bezel disposed in the recess and having a peripheral edge supported on the A-surface on the bezel support member.

20 Claims, 5 Drawing Sheets

(56) References Cited

U.S. PATENT DOCUMENTS

| | | | |
|---|---|---|---|
| 9,061,647 B2* | 6/2015 | Steinbrecher | B60R 13/02 |
| 2020/0406798 A1* | 12/2020 | Singh | B64D 11/064 |
| 2022/0153189 A1* | 5/2022 | Nascimento | B60Q 3/54 |
| 2022/0379785 A1* | 12/2022 | Sacco | B60N 2/5883 |
| 2022/0402416 A1* | 12/2022 | Yang | B60N 2/5883 |

FOREIGN PATENT DOCUMENTS

| | | |
|---|---|---|
| JP | 2013-203090 A | 10/2013 |
| WO | 2013135871 A1 | 9/2013 |

* cited by examiner

TRIM COVER ASSEMBLY WITH BEZEL SUPPORT

CROSS-REFERENCE TO RELATED APPLICATION

This application claims foreign priority benefits under 35 U.S.C. § 119(a)-(d) to CN patent application 2021 10 685 3296 filed Jun. 21, 2021, the disclosure of which is hereby incorporated by reference in its entirety.

TECHNICAL FIELD

The present application is directed to a trim cover assembly, and more particularly, a trim cover assembly with a support member for a bezel.

BACKGROUND

Vehicle seats having seat bottoms and seatbacks typically include foam cushions positioned on a seat frame to provide support to vehicle occupants. The cushions include a trim cover disposed thereon to provide an aesthetically pleasing appearance for the occupant support surface. The seats may include various fixtures for attaching trim covers to the seat frame, and may include particular features to form design elements in the occupant support surface.

Conventional seatbacks typically include a foam cushion disposed on a seatback frame. The conventional seatbacks have a trim cover secured over the foam cushion. At junctures between other components and at the edges of recesses formed in the cushions to receive components, such as plastic latches and bezels, and at curves and corners of the seatback design, the trim cover may wrinkle at edges of the components, dimple into the foam, or even sag into gaps between the components and foam, at the cost of the aesthetics of the seatback.

SUMMARY

According to at least one embodiment, a seat assembly includes a seat cushion having an external surface and defining a recess therein, the recess being open to the external surface and being sized to receive one or more bezel components and a trim cover assembly disposed over the seat cushion. The trim cover assembly includes a trim cover having an A-side as an occupant surface and a B-side, opposite the A-side, facing the external surface of the seat cushion, with the trim cover defining a cover opening therethrough generally corresponding to the recess in the seat cushion. The trim cover also has a plurality of flaps spaced about the cover opening, with each flap having an inner portion towards the cover opening and an outer portion opposite the inner portion. The trim cover assembly also includes a bezel support member having an A-surface contacting the B-side of the trim cover, and a B-surface opposite the A-surface. The bezel support member has an inner periphery defining a support opening corresponding to the cover opening, and an outer periphery, where the flaps of the trim cover are folded through the support opening and secured to at least a portion of the bezel support member or to the trim cover to support the cover opening. The seat assembly also includes a bezel disposed in the recess and having a peripheral edge supported on the A-surface on the bezel support member.

According to one or more embodiments, each flap may have a tapering shape toward the inner portion. In one or more embodiments, each inner portion may be folded over the bezel support member and secured such that A-side of trim cover is visible from the B-side of the trim cover. In certain embodiments, the bezel support member may be a polypropylene plate. In at least one embodiment, each flap folded onto the bezel support member may be secured on the B-surface of the bezel support member such that the B-side of the flap contacts the B-surface. In one or more embodiments, each flap may be secured to the bezel support member via a corresponding seam, with each corresponding seam being up to 5 mm. In at least one embodiment, each flap may be secured on the B-side of the trim cover to at least one layer of the trim cover to form a pocket for receiving the bezel support member.

According to at least one embodiment, a trim cover assembly includes a trim cover disposable over a seat cushion having a recess, with the trim cover having an A-side as an occupant surface and a B-side, opposite the A-side, facing an external surface of the seat cushion. The trim cover defines a cover opening therethrough that, when disposed over the seat cushion, generally corresponds to the recess in the seat cushion. The trim cover has a plurality of flaps spaced about the cover opening with each flap having an inner portion towards the cover opening and an outer portion opposite the inner portion. The trim cover assembly further includes a bezel support member having an outer periphery and an inner periphery defining a support opening corresponding to the cover opening, and having an A-surface contacting the B-side of the trim cover and a B-surface opposite the A-surface. The inner portion of each flap is folded through the support opening and over the bezel support member and secured to at least a portion of the bezel support member or to the trim cover.

According to one or more embodiments, each flap may have a tapering shape from the outer portion toward the inner portion. In at least one embodiment, the inner portion of each flap may be folded over the bezel support member such that A-side of trim cover is visible from the B-side of the trim cover. In one or more embodiments, each flap may be folded onto the bezel support member and secured on the B-surface of the bezel support member such that the B-side of the flap contacts the B-surface. In at least one embodiment, each flap may be secured to the bezel support member via a corresponding seam, with each corresponding seam being up to 5 mm. According to one or more embodiments, each flap may be secured on the B-side of the trim cover to at least one layer of the trim cover to form a pocket for receiving the bezel support member.

According to at least one embodiment, a method includes cutting a pattern in a trim cover to form a plurality of flaps, with each flap having an inner portion surrounding and defining a cover opening through the trim cover, and providing a bezel support member on a B-side of the trim cover, the bezel support member defining a support opening therethrough and corresponding to the cover opening. The method further includes folding the flaps through the support opening such that the B-side of the trim cover at each inner portion faces a back surface of the bezel support member, and securing the flaps of the trim cover to the bezel support member or to the trim cover to form a trim cover assembly for covering a seat.

According to one or more embodiments, securing the flaps may include stitching the inner portions to the bezel support member to form a corresponding seam for each flap. In further embodiments, the corresponding seam may be up to 5 mm. In at least one embodiment, securing the flap may include securing the flaps to at least one layer of the trim cover on the B-side of the trim cover. In one or more embodiments, each flap may have a tapering shape toward the cover opening. According to one or more embodiments, the method may further include covering a seat having a cushion defining a recess therein and exposed to an external surface of the cushion with the trim cover assembly such that, when disposed on the seat, the cover opening corresponds to the recess. In certain further embodiments, the method may include placing a bezel into the recess such that an outer edge of the bezel contacts an A-side of the trim cover, opposite the B-side, wherein the outer edge of the bezel is supported by the bezel support member under the trim cover.

DETAILED DESCRIPTION

Figure 1:
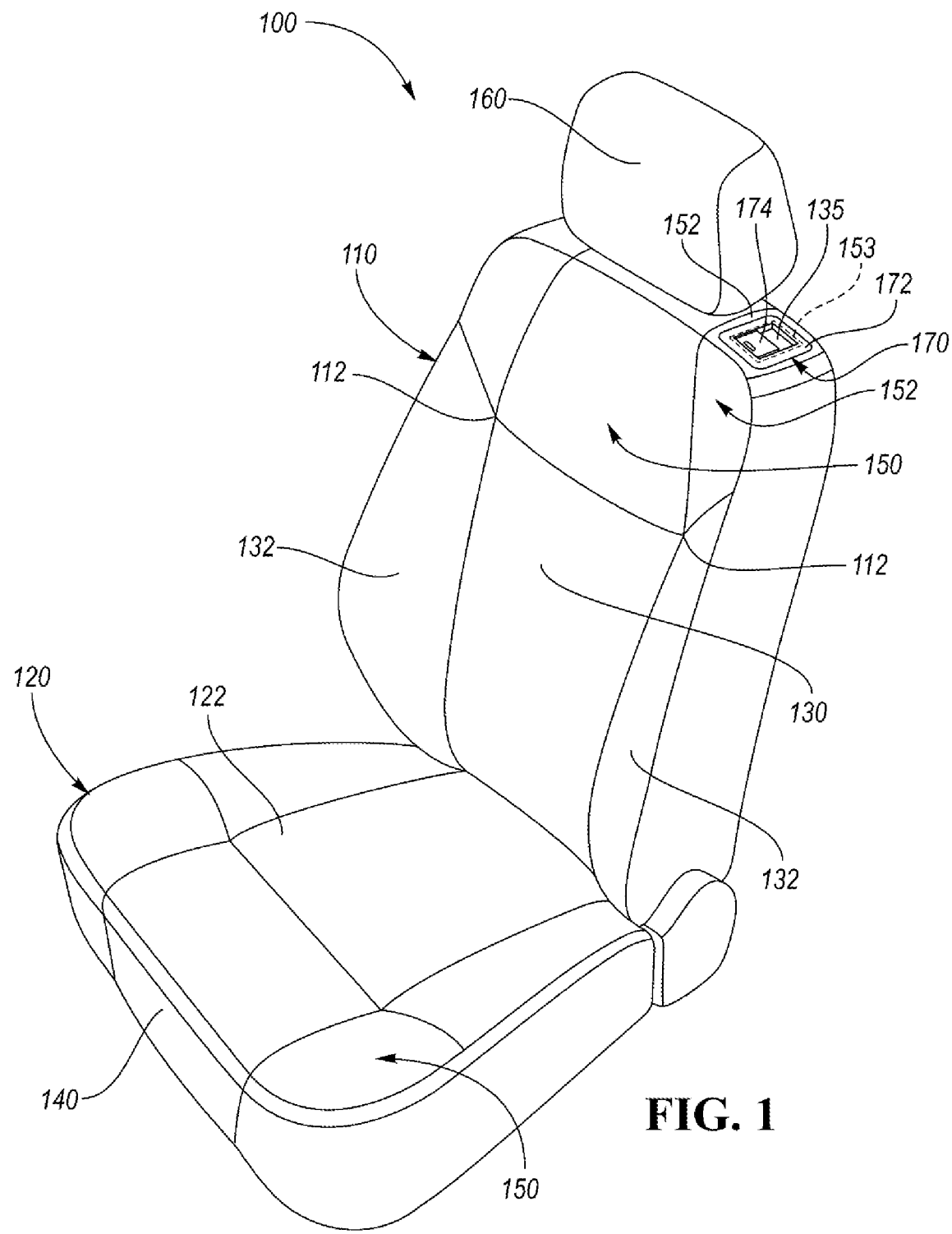
FIG. 1 is a perspective schematic illustration of a representative vehicle seat, according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except in any examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. As used herein, the term "about" means that the amount or value in question may be the specific value designated or some other value in its neighborhood. The term "about" or "generally" denoting a certain value is intended to denote a range within +/−5% of the value. As one example, the phrase "about 100" denotes a range of 100+/−5, i.e. the range from 95 to 105. When the term "about" or "generally" is used, it can be expected that similar results or effects according to the invention can be obtained within a range of +/−5% of the indicated value. It should also be appreciated that integer ranges (e.g., for measurements or dimensions) explicitly include all intervening integers. For example, the integer range 1-10 explicitly includes 1, 2, 3, 4, 5, 6, 7, 8, 9, and 10. Similarly, the range 1 to 100 includes 1, 2, 3, 4, . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

According to one or more embodiments, a trim cover assembly includes a trim cover having a plurality of flaps surrounding and defining a cover opening for receiving a bezel therethrough when the trim cover assembly is covering a seat with a corresponding recess for the bezel in the seat cushion. The trim cover assembly also includes a bezel support member on the B-side of the trim cover. The flaps have an inner portion towards the cover opening, and are folded through a support opening defined in the bezel support member, such that the A-side of the flap is visible from the B-side of the trim cover. The flaps of the trim cover are secured onto at least a portion of the bezel support member or to the B-side of the trim cover (forming a pocket to receive the bezel support member therein) at the inner portions such that the cover opening retains its shape and the bezel can be supported without compromising the aesthetic look of the trim cover at the cover opening.

Referring now to the figures, where like numerals are used to designate like structure throughout to the drawings, a schematic vehicle seat assembly in accordance with at least one embodiment of the present disclosure is generally shown at by seat assembly 100 in FIG. 1.

FIG. 1 illustrates a schematic view of a seat assembly 100. The seat assembly 100 may be adapted for use in a motor vehicle, such as a car or truck, or may be used with other seat assemblies including in aircraft, theater seats or any suitable seat assemblies, and the discussion of the seat assembly 100 in a vehicle is not intended to be limiting. While the seat assembly 100 is illustrated in FIG. 1 to be a bucket seat assembly, it should be understood that the principles of the present disclosure are applicable to other types of seat assemblies, such as bench, captain, and other types of seat assemblies.

As shown in FIG. 1, the vehicle seat assembly 100 includes a seatback 110 and a seat bottom 120, connected to form seat assembly 100 for supporting an occupant in the vehicle. The seatback 110 may be pivotally mounted to seat bottom 120. The seat bottom 120 may be mounted on a seat frame (not shown) which can be removably secured to the vehicle floor. In some embodiments, the seatback 110 may include a head restraint 160.

In at least one embodiment, each of the seatback 110 and seat bottom 120 include foam cushion 130, 140, respectively. The foam cushion 130, 140 can be conventionally secured to a seat frame (not shown) by any method generally known in the art. Each foam cushion 130, 140 may be one or more foam parts, joined together to form the seat component. For example, the foam cushion 130 may include side bolster portions 132, or any other components to meet a desired design. The foam cushions 130, 140 can have any suitable size and be formed from any suitable configuration of components. The seatback foam cushion 130 and the seat bottom foam cushion 140 can independently comprise any suitable comfort foam material such as, but not limited to, a suitable resilient polymer, and can independently be formed in any suitable manner. For example, the foam cushions 130, 140 may be formed of conventional polyurethane foam, soy-based foam, silicone, thermoplastic olefins, thermoplastic urethanes, and/or natural oil-based expanded polyurethanes, soy-based polyurethane, polymer fibers, non-woven polyester pads, latex foams and the like. The foam cushions 130, 140 are formed of any suitable comfort material that provides soft resilience as the seat assembly is deflected during use when an occupant is in a seated position. In at least one embodiment, suitable cushion materials will have a density of 1.5 to 4.5 pcf, in another embodiment of 2.0 to 3.75 pcf, and in yet other embodiments of 2.7 to 3.0 pcf. Density of the cushion material can be measured by ASTM test method No. D3574.

The seat assembly 100 also includes trim cover assembly 150 adapted to engage the foam cushions 130, 140 in a covering relationship. The trim cover assembly 150 may be secured to the foam cushions 130, 140 in any suitable manner, such as, but not limited to, by mechanical fasteners or heat forming. The trim cover assembly 150 includes a trim cover 152, which may comprise any material commonly known in the art. By way of example, some of the known materials include cloth, fabric, leather, synthetic leather, vinyl, synthetic suede, non-woven fabric, or combinations thereof (fabric-to-fabric, leather-to-leather, fabric-to-leather, leather-to-fabric, etc.), or polymers of sufficient quality and thickness for use in seat trim applications. Polymer trim materials may include a flexible closed cell polymer skin material such as polyvinyl, polyvinyl chloride (PVC), thermoplastic olefin (TPO), or thermoplastic urethane (TPU). Additionally, materials for use as the trim cover 152 may include a foam backing (not shown, but generally known in the art) which may be manufactured from a variety of polymer foam materials. By way of example, the foam backing may be polyethylene, polypropylene, polyurethane, or a polystyrene foam. Optionally, a mesh or reinforcing material (not shown, but generally known in the art) such as fiberglass or nylon may be applied to the foam backing or back of the trim cover 152 for increasing strength without increasing rigidity. The trim cover assembly 150 provides an occupant seating surface 112, 122 for the seatback 110, and seat bottom 120, respectively. The occupant seating surface 112, 122 is formed on the A-side of the seat assembly 100, which is the external surface visible to the occupant. It should be understood that the cushion 130 for the seatback 110 can differ from the cushion 140 of the seat bottom 120. Likewise, it should be understood that the trim cover assembly 150 for the seat back 14 can differ from the trim cover assembly 150 for the seat bottom 120.

Referring again to FIG. 1, the foam cushions 130, 140 may define one or more recesses 135 in the foam cushions 130, 140, with the recess 135 being exposed to an external surface (not shown) of the foam cushions 130, 140. Although shown as a recess 135 in the foam cushion 130 of the seatback 110 for receiving a component 174 with a side bezel 170 (or, interchangeably hereinafter bezel 170) for attachment to a seat frame or other mechanical component of the seat (not shown). The recess 135 or recesses may be any suitable shape and depth, and may be included in any suitable location on the foam cushions 130, 140, as based on the requirements for the component 174 of the seat assembly 100. For example, the recess may be for a component 174 (e.g., a retractor or handle) that may require a bezel, such as a retractor bezel, seatbelt component, or other plastic feature, and may be sized and shaped according to the desired aesthetic design of such components. Although the component 174 and the bezel 170 are shown as singular components, each may comprise multiple pieces to form the component 174 and/or the bezel 170. As such, the component 174 and the bezel 170 may include one or more pieces which form a perimeter which corresponds to the recesses 135 in the cushion. The trim cover assembly 150 also includes a cover opening 153 defined in the trim cover 152, which corresponds to the respective recess 135 in the cushion 130. In the embodiment shown in FIG. 1, the recess 135 and the cover opening 153 may have a corresponding size and shape to receive the bezel 170, however other components are also contemplated, and the depiction of the recess 135 being corresponding to a bezel 170 is not intended to be limiting.

Figure 2:
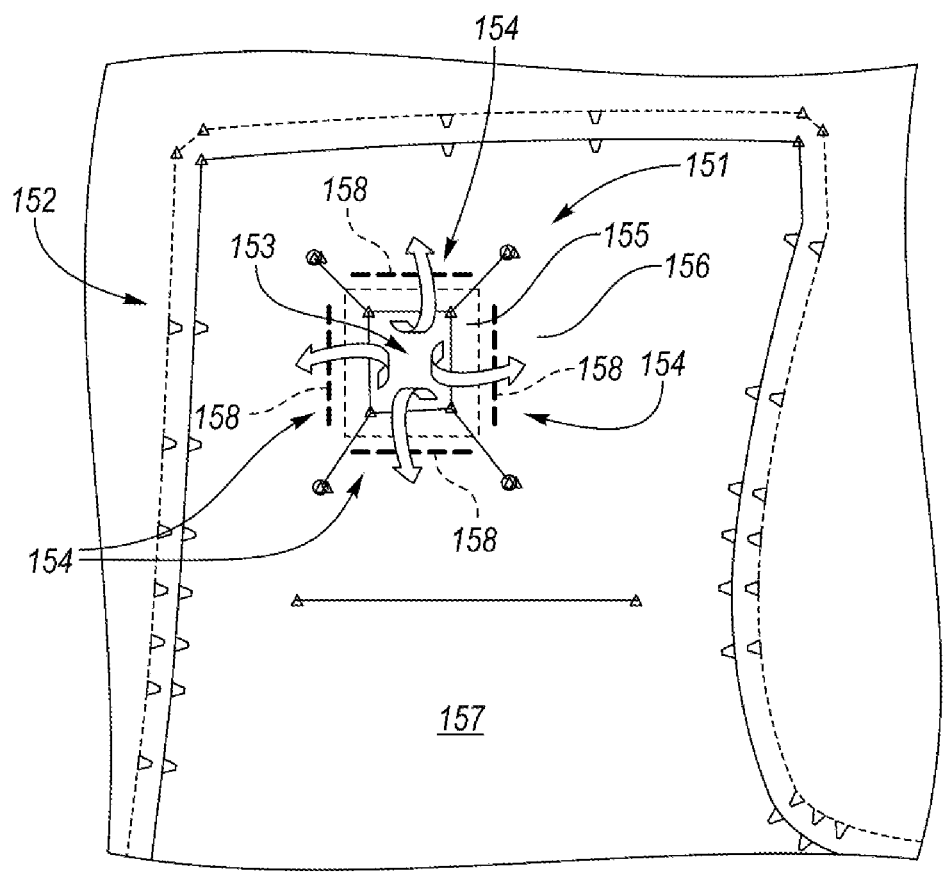
FIG. 2 is a schematic illustration of the B-side of a trim cover, according to at least one embodiment.

Referring to FIG. 2, the B-side 151 of the trim cover 152 for the seatback 110 is shown, according to an embodiment. The B-side 151 of the trim cover 152 is the opposite surface of the trim cover 152 from the occupant surface 112 of the seatback 110. The trim cover 152 has a cut pattern forming a plurality of flaps 154 surrounding and defining the cover opening 153. Each of the plurality of flaps 154 has an inner portion 155 adjacent the cover opening 153, and an outer portion 156 opposite the inner portion 155, with the outer portion 156 connected to the body region 157 of the trim cover 152. In certain embodiments, as shown in FIG. 2, each flap 154 may have a tapering shape from the outer portion 156 to the inner portion 155, such that an overall width of the flap 154 is greater at the outer portion 156 than the inner portion 155. In at least one embodiment, the width of the inner portion 155 may be, in certain embodiments, at least 5 mm, in other embodiments, at least 6.5 mm, and in yet other embodiments at least 8 mm. In certain embodiments, the width may be 5 mm to 20 mm, in other embodiments, 6 mm to 18 mm, and in yet other embodiments, 8 mm to 15 mm. Although shown as a generally straight line forming a trapezoidal flap, the tapering sides of the flaps 154 may have any suitable tapering geometry, such as a curved or stepped shape, and depiction of a straight line is not intended to be limiting. The area between the inner portion 155 and the outer portion 156 of each flap may be defined as area 158 for each flap 154, and in certain embodiments, the area 158 may define where the inner portion 155 is secured upon folding such that the area 158 is aligned with and/or corresponds to the seams 190 which will be discussed in further detail below. Although depicted as a line in FIG. 2, the area 158 is shown for illustrative purposes for reference and need not be a physical marking on the B-side 151 of the trim cover 152, and may be any suitable shape to form an area 158 such as, but not limited to, a rectangle, square, circle, or oval to define the area 158 aligned with the securing of the inner portion 155. The area 158 may have a dimension referred to as the length of the flap 154, with the length in certain embodiments being from 15 to 50 mm, 17 to 40 mm in other embodiments, and 20 to 30 mm in yet other embodiments. In one or more embodiments, the length of each flap 154 may be at least 20 mm.

Figure 3:
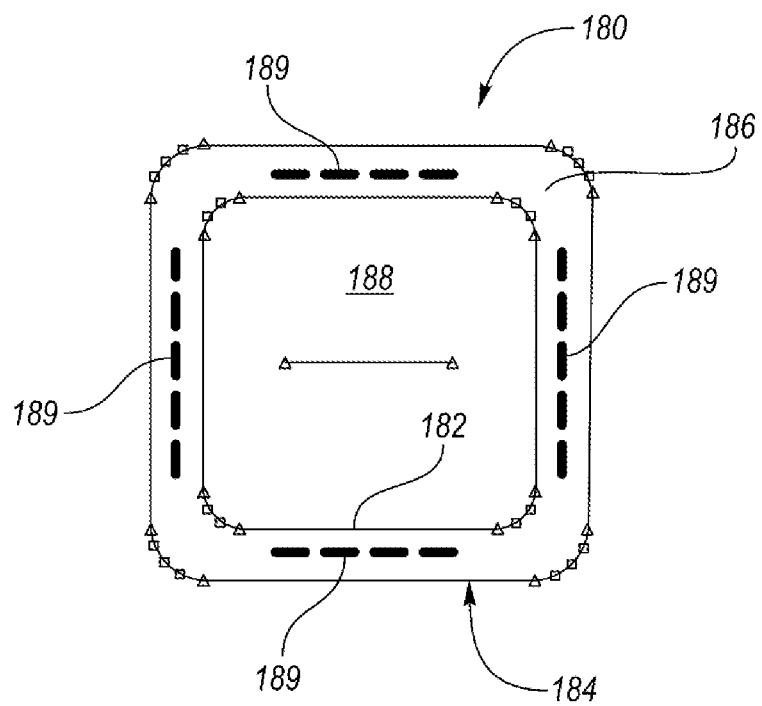
FIG. 3 is a schematic illustration of the B-surface of a bezel support member, according to at least one embodiment.

The trim cover assembly 150 also includes a bezel support member 180, shown in FIG. 3 from the rear side according to an embodiment. The bezel support member 180 has an A-surface (not shown), a B-surface 181, and has an inner periphery 182 and an outer periphery 184, with a body 186 therebetween. The inner periphery 182 defines a support opening 188, which corresponds to the cover opening 153, as will be discussed in further detail with respect to FIG. 4. Although the bezel support member 180 is shown as having a generally square shape and the support opening 188 is shown as having a generally square shape, this is not intended to be limiting, and the bezel support member 180 and/or the support opening 188 may have a shape as based on the desired design of the seat, the recess 135 and/or the cover opening 153. In one or more embodiments, the support opening 188 may have a length and/or a width of at least 20 mm, in other embodiments, at least 25 mm, and in yet other embodiments, at least 30 mm. Thus, in some embodiments, where the support opening 188 has a generally square shape, the dimensions may be at least, in some embodiments, 20×20 mm, in other embodiments at least 25×25 mm, and in yet further embodiments 30×30 mm. However, the support opening 188 may be designed to have a size corresponding to the recess for the bezel 170 to be received therein. Moreover, the body 186 of the bezel support member 180 may have any suitable width (from inner to outer periphery) and overall length such that the flaps 154 of the trim cover 152 can be secured to the body 186 of the bezel support member 180. For example, in some embodiments, the width may be at least 5 mm, in other embodiments, at least 6.5 mm, and in yet other embodiments, at least 8 mm. In further examples, the overall length may be, in some embodiments, at least 25 mm, in other embodiments, at least 30 mm, and in yet other embodiments at least 40 mm. In yet further embodiments, the length may be at least 50 mm. Generally, the bezel support member 180 may be sized according to the corresponding recess 135 in the foam cushion 130, 140 to provide structural support to the trim cover 152 when the trim cover assembly 150 is mounted to the seat assembly 100. In the embodiment shown, the body 186 of the bezel support member 180 is sized such that the inner periphery 182 forms the support opening 188 larger than the recess 135, but generally sized to form an edge to the recess 135 such as to support edges 172 of the bezel 170 upon insertion in the recess. The body 186 may include an area 189 on each side defining where the inner portion 155 is secured such that the area 189 is aligned with and/or corresponds to the seams 190 which will be discussed in further detail below. Although depicted as a line in FIG. 3, the area 189 is shown for illustrative purposes for reference and need not be a physical marking on the B-side of the bezel support member 180, and may be any suitable shape to form an area 189 such as, but not limited to, a rectangle, square, circle, or oval to define the area 189 aligned with the securing of the inner portion 155.

In one or more embodiments, the bezel support member 180 may be any suitable material to provide structural support to the cover opening 153, including, but not limited to, leather, fabric, or polypropylene. The material of the bezels support member 180 generally has sufficient rigidity to maintain the shape of the cover opening 153 as based on the shape of the support opening 188 and the bezel support member 180 overall. For example, the bezel support member 180 may be a polypropylene plate. Moreover, in certain embodiments, the material of the bezel support member 180 may be configured to receive stitching therein upon application of a seam through the trim cover 152 and into the bezel support member 180. In other embodiments, the material of the bezel support member 180 may be selected such that the bezel support member 180 can be secured to the trim cover 152 via an adhesive, stitching, welding, or by mechanical fastener(s). As such, the bezel support member 180 may be, in certain embodiments, a woven or non-woven material of sufficient rigidity to provide structural support to the cover opening 153 to improve its shape retention and reduce wrinkling of the trim cover 152 about the cover opening 153. Moreover, the material may be capable of receiving stitching and/or seams therein via manual or machine sewing such that the bezel support member 180 can be secured to a trim cover assembly 150 component, such as trim cover 152 or other layer of the trim cover 152 on the B-side of the trim cover 152.

Figure 4:
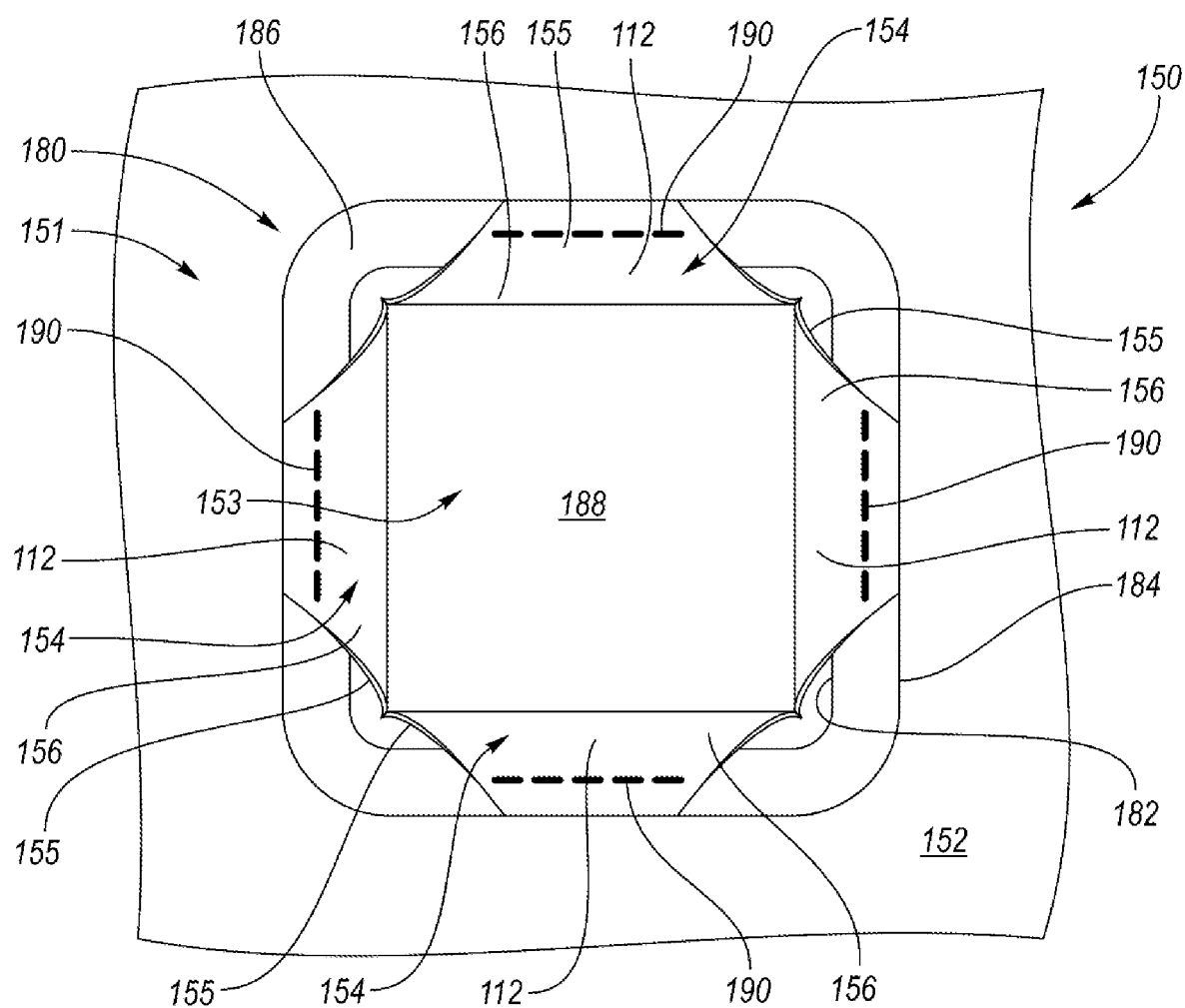
FIG. 4 is a schematic illustration of the B-side of a trim cover assembly, according to an embodiment.

Referring to FIG. 4, a rear view of the trim cover assembly 150 with the trim cover 152 and the bezel support member 180 is shown according to an embodiment. The B-side 151 of the trim cover 152 is shown with the support opening 188 of the bezel support member 180 positioned around the cover opening 153. In FIG. 4, the B-surface 181 of the bezel support member 180 is shown, with the A-surface (not shown) contacting the B-side 151 of the trim cover 152. Each flap 154 of the trim cover 152 is folded back over the bezel support member 180 through the support opening 188, such that the A-side (occupant support surface 112) of the flaps 154 of the trim cover 152 is visible from the back side of the trim cover assembly 150. As such, the support opening 188 may, in some embodiments, be sized dimensionally larger than that of the cover opening 153 so the cover can be folded through the support opening 188 and onto the bezel support member. For example, the support opening 188 may be, in some embodiments at least 5 mm larger than the cover opening 153 to allow for the inner portion 155 to fold over, in other embodiments, at least 6.5 mm larger, and in yet other embodiments, at least 8 mm larger. In the embodiment shown in FIG. 4, the inner portion 155 of each flap 154 is aligned within the width of the body 186 of the bezel support member 180, and secured to the body 186. Although shown as being sandwiched between layers of the trim cover for securement, the bezel support member may, in some embodiments, be secured on it's A-surface to the B-side of the trim cover, however the bezel support member 180 may be held pressed between the B-side and the flap portions 154.

In the embodiment shown in FIG. 4, the inner portion 155 of each flap 154 is secured to at least a portion of the bezel support member 180 via corresponding seams 190 stitched to the body 186 between the inner periphery 182 and the outer periphery 184. Although the embodiment of FIG. 4 shows the inner portions 155 as being stitched to the body 186 via seams 190, the flaps 154 may be secured to the bezel support member 180 by any suitable mechanism, such as, but not limited to, mechanical fastener(s), welding, or adhesives. Although in the embodiment of FIG. 4, the seams 190 are shown running generally perpendicular to the width of the body 186, the seams 190 may be in any suitable direction along the body 186, and being shown generally perpendicular to the width of the body 186 is not intended to be limiting. In certain embodiments, as shown in FIG. 4, the seams 190 may be 1 to 10 mm along the body 186, in other embodiments 2 to 8 mm, and in yet other embodiments 3 to 7 mm. In at least one embodiment, the seams may be up to 5 mm along the body 186, and run generally perpendicular to the width of the body 186 of the bezel support member 180.

Figure 5:
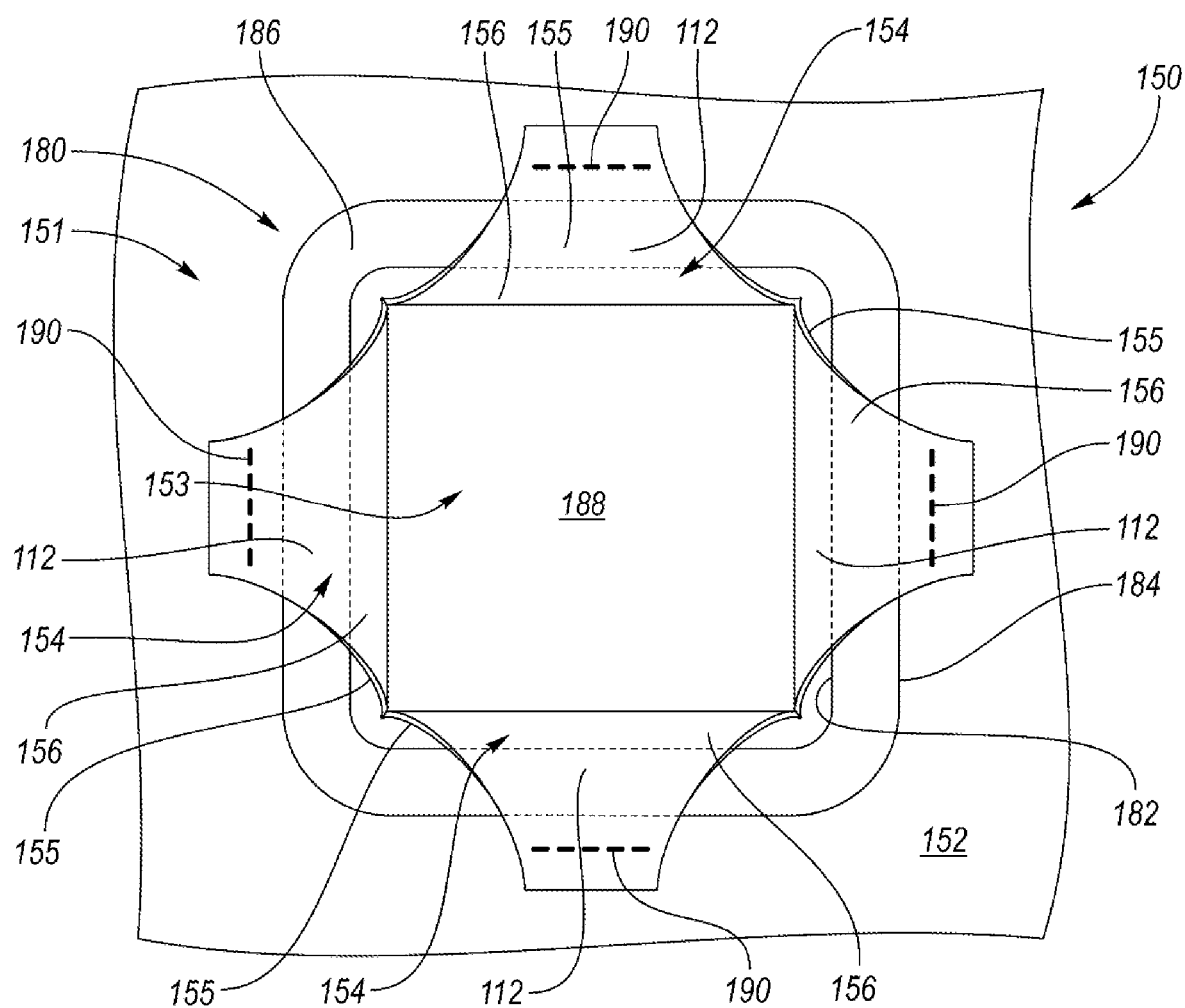
FIG. 5 is a schematic illustration of the B-side of a trim cover assembly, according to another embodiment.

Moreover, referring to another embodiment as shown in FIG. 5, the inner portion 155 of each flap 154 may be secured to a B-surface of the trim cover 152, or when the trim cover 152 includes multiple layers, one or more of the layers of the trim cover 152 towards the B-side 151 of the trim cover 152. The inner portions 155 may be folded such that the inner portions 155 extend past the outer periphery 184 for securing to the trim cover 152. Thus, each flap 154 forms a pocket to secure the bezel support member 180 therein, with the securing of the inner portion 155 holding the bezel support member 180 in place to structurally support the cover opening 153. In one or more embodiments, the flaps 154 may be secured to the trim cover 152 by stitching at seams 190, which may be adjacent to the outer periphery 184 to form the pocket for receiving the bezel support member 180 therein.

In certain embodiments, the stitching or seam may reach the A-side of the trim cover 152, however the sizing of the bezel support member 180 and location of the inner portion 155 folded over the bezel support member 180 may be located such that the edges 172 of the bezel 170 hides the seam.

Figure 6:
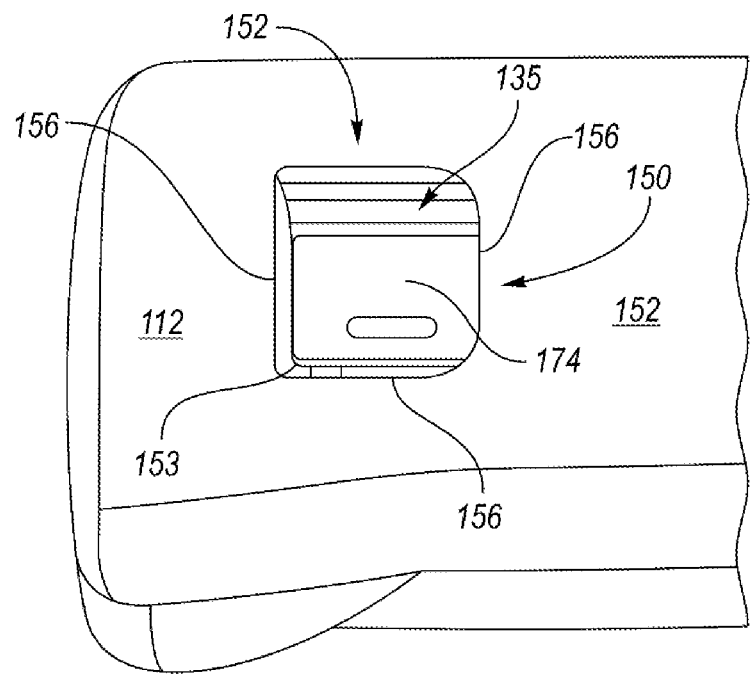
FIG. 6 is a top perspective view of a seat, according to at least one embodiment.

Referring to FIG. 6, the occupant support surface 112 of the seat assembly 100 is shown. The trim cover assembly 150 is secured to the cushions 130, 140 such that the recess 135 is exposed for the component 174 to be accessible via the cover opening 153. The folded flaps 154 define the outer edges of the cover opening 153, based on the folding of the inner portions 155 of the flaps 154 through the support opening 188. As such, the bezel support member 180 better defines the cover opening 153 and avoids the appearance of wrinkles in visible surface of the trim cover 152 at the recess 135.

Figure 7:
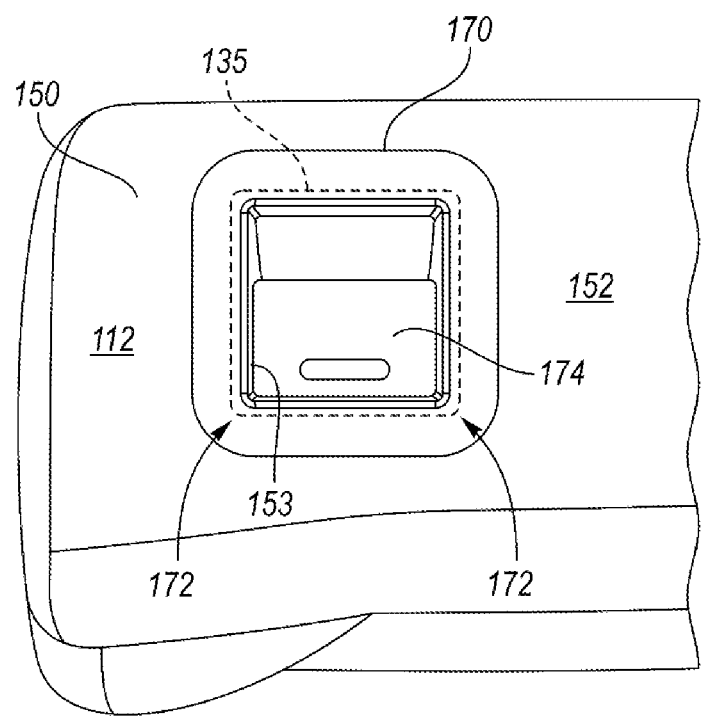
FIG. 7 shows a partial perspective view the seat of FIG. 5 with a bezel.

Referring to FIG. 7, the bezel 170 is shown inserted in the recess 135 around the component 174. Although shown as single pieces for component 174 and the bezel 170, each of the component 174 and the bezel 170 may comprise one or more components or one or more bezel components that define a perimeter that corresponds to the shape of the recess 135. The bezel has peripheral flanges or peripheral edges that form edges 172 of the bezel 170 that lay on the occupant support surface 112 of the trim cover 152, and are further supported by the trim cover assembly 150 by way of the bezel support member 180 being positioned under the edges 172. As previously discussed, the bezel support member 180 may be sized and shaped according to the profile of the bezel 170 and/or the recess 135 such that the trim cover 152 has the cover opening 153 without wrinkles and with support to hold the bezel 170 thereon. By including the bezel support member 180 in the trim cover assembly 150, visible seams and selvedge on the finished trim can be avoided as compared with conventional trim cover assemblies. Moreover, the width of the edges 172 on the bezel 170 may be smaller than conventional bezel edges (with a lower limit as there is no visible seams and selvedge), thus providing design and aesthetic flexibility to the bezel edges 172. Furthermore, the supported cover opening 153 removes the need for an additional part as a fixing point for the trim at the recess 135, and incorporates the bezel support member 180 as part of the trim cover assembly 150.

According to another embodiment of the present disclosure, a method of assembling a seat with a trim cover assembly having a bezel support member is provided. The method includes cutting a pattern in a trim cover to form a plurality of flaps, with each flap having an inner portion surrounding and defining a cover opening through the trim cover. Furthermore, the method includes providing and positioning the bezel support member on a B-side of the trim cover, the bezel support member defining a support opening therethrough corresponding to the cover opening. The flaps are then folded through the support opening such that the B-side of each inner portion of the trim cover contacts a B-surface of the bezel support member. The method further includes securing the flaps of the trim cover to the bezel support member or to a layer on the B-side of the trim cover (to form a pocket to hold the bezel support member therein) to form a trim cover assembly for covering a seat. In certain embodiments, the inner portions of the flaps may be secured to at least a portion of the bezel support member or to the trim cover by stitching the inner portions to the bezel support member or the B-side of the trim cover to form a corresponding seam for each flap. When secured to the trim cover, the flaps form a pocket for receiving the bezel support member therein, and the bezel support member is positioned on the B-side of the trim cover prior to the securing of the flaps with the inner portions extending past the outer periphery of the bezel support member.

The method may further include, in certain embodiments, covering a seat having a cushion with the trim cover assembly, the cushion defining a recess therein and the recess being exposed to an external surface of the cushion. The cover opening corresponds to the recess such that the recess is exposed through the cover opening, and the bezel support member defines an outer edge in the trim cover for the cover opening. In certain further embodiments, the method may further include placing a bezel into the recess such that an outer edge of the bezel contacts an A-side of the trim cover, opposite the B-side such that the outer edge of the bezel is supported by the bezel support member under the trim cover.

According to one or more embodiments, a trim cover assembly includes a trim cover having a plurality of flaps surrounding and defining a cover opening for receiving a bezel therethrough when the trim cover assembly is covering a seat with a corresponding recess for the bezel in the seat cushion. The trim cover assembly also includes a bezel support member on the B-side of the trim cover positioned according to the corresponding recess in the seat cushion. The flaps have an inner portion towards the cover opening, which are folded through a support opening defined in the bezel support member and over onto the bezel support member, such that the A-side of the flap is visible from the B-side of the trim cover. The flaps of the trim cover are secured onto the bezel support member at the inner portions such that the cover opening retains its shape and the bezel can be supported without compromising the aesthetic look of the trim cover at the cover opening, and allow for design changes to the bezel component by removing the visible seams and selvedge at the trim cover opening.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat cushion having an external surface and defining a recess therein, the recess being open to the external surface and being sized to receive one or more bezel components;
   a trim cover assembly disposed over the seat cushion, the trim cover assembly including
      a trim cover having an A-side as an occupant surface and a B-side, opposite the A-side, facing the external surface of the seat cushion, with the trim cover defining a cover opening therethrough generally corresponding to the recess in the seat cushion, and having a plurality of flaps spaced about the cover opening, each flap having an inner portion towards the cover opening and an outer portion opposite the inner portion;
      a bezel support member having an A-surface contacting the B-side of the trim cover, and a B-surface opposite the A-surface, the bezel support member having an inner periphery defining a support opening corresponding to the cover opening, and an outer periphery, where the flaps of the trim cover are folded through the support opening and secured to at least a portion of the bezel support member or to the trim cover to support the cover opening; and
   a bezel disposed in the recess and having a peripheral edge supported on the A-surface on the bezel support member.

2. The seat assembly of claim 1, wherein each flap has a tapering shape toward the inner portion.

3. The seat assembly of claim 1, wherein each inner portion is folded over the bezel support member and secured such that A-side of trim cover is visible from the B-side of the trim cover.

4. The seat assembly of claim 1, wherein the bezel support member is a polypropylene plate.

5. The seat assembly of claim 1, wherein each flap folded onto the bezel support member is secured on the B-surface of the bezel support member such that the B-side of the flap contacts the B-surface.

6. The seat assembly of claim 1, wherein each flap is secured to the bezel support member via a corresponding seam, with each corresponding seam being up to 5 mm.

7. The seat assembly of claim 1, wherein each flap is secured on the B-side of the trim cover to at least one layer of the trim cover to form a pocket for receiving the bezel support member.

8. A trim cover assembly comprising:
   a trim cover disposable over a seat cushion having a recess, the trim cover having an A-side as an occupant surface and a B-side, opposite the A-side, facing an external surface of the seat cushion, with the trim cover defining a cover opening therethrough that, when disposed over the seat cushion, generally corresponds to the recess in the seat cushion, and having a plurality of flaps spaced about the cover opening, each flap having an inner portion towards the cover opening and an outer portion opposite the inner portion; and
   a bezel support member having an outer periphery and an inner periphery defining a support opening corresponding to the cover opening, and the bezel support member having an A-surface contacting the B-side of the trim cover and a B-surface opposite the A-surface,
   wherein the inner portion of each flap is folded through the support opening and over the bezel support member and secured to at least a portion of the bezel support member or to the trim cover.

9. The trim cover assembly of claim 8, wherein each flap has a tapering shape from the outer portion toward the inner portion.

10. The trim cover assembly of claim 8, wherein the inner portion of each flap is folded over the bezel support member such that A-side of trim cover is visible from the B-side of the trim cover.

11. The trim cover assembly of claim 8, wherein each flap is folded onto the bezel support member and secured on the B-surface of the bezel support member such that the B-side of the flap contacts the B-surface.

12. The trim cover assembly of claim 8, wherein each flap is secured to the bezel support member via a corresponding seam, with each corresponding seam being up to 5 mm.

13. The trim cover assembly of claim 8, wherein each flap is secured on the B-side of the trim cover to at least one layer of the trim cover to form a pocket for receiving the bezel support member.

14. A method comprising:
   cutting a pattern in a trim cover to form a plurality of flaps, with each flap having an inner portion surrounding and defining a cover opening through the trim cover;
   providing a bezel support member on a B-side of the trim cover, the bezel support member defining a support opening therethrough and corresponding to the cover opening;
   folding the flaps through the support opening such that the B-side of the trim cover at each inner portion faces a back surface of the bezel support member; and
   securing the flaps of the trim cover to the bezel support member or to the trim cover to form a trim cover assembly for covering a seat.

15. The method of claim 14, wherein securing the flaps includes stitching the inner portions to the bezel support member to form a corresponding seam for each flap.

16. The method of claim 15, wherein the corresponding seam is up to 5 mm.

17. The method of claim 14, wherein securing the flaps includes securing the flaps to at least one layer of the trim cover on the B-side of the trim cover.

18. The method of claim 14, wherein each flap has a tapering shape toward the cover opening.

19. The method of claim 14, further comprising covering a seat having a cushion defining a recess therein and exposed to an external surface of the cushion with the trim cover assembly such that, when disposed on the seat, the cover opening corresponds to the recess.

20. The method of claim 19, further comprising:
   placing a bezel into the recess such that an outer edge of the bezel contacts an A-side of the trim cover, opposite the B-side, wherein the outer edge of the bezel is supported by the bezel support member under the trim cover.

* * * * *